Patented July 10, 1945

2,380,234

UNITED STATES PATENT OFFICE 2,380,234

HYDROCARBON CONDENSATION PROCESS

Homer J. Hall, Roselle, N. J., assignor to Standard Oil Development Company, a corporation of Delaware No Drawing. Application September 25, 1940, Serial No. 358,213

12 Claims. (Cl. 260—683.4)

The present invention relates to the treatment of hydrocarbons in the presence of liquid phase acid catalysts. More particularly, it relates to the catalytic treatment of mixtures of hydrocarbons containing monoolefins and which may contain isoparaffins, preferably normally gaseous isoparaffins, so as to produce normally liquid, condensed hydrocarbon products boiling chiefly within the motor fuel boiling range. The process of the invention is applicable to the polymerization of olefins but is chiefly concerned with the alkylation of isoparaffins with monoolefins.

It is an object of the invention to effect an improved conversion of isoparaffins when reacted with monoolefins to produce normally liquid, substantially completely saturated hydrocarbons with improved yields of the desired fractions. It is an object of the invention to effect the polymerization of monoolefins of either normally liquid or gaseous character to produce olefinic polymers suitable for use in motor fuels, preferably after a subsequent hydrogenation treatment, with improved yields. It is an object of the invention to increase the surface of contact between the various catalytic components for effecting the desired reactions and the reactants fed to the reaction chambers. It is an object of the invention to carry out condensation reactions involving particularly the lower molecular weight hydrocarbons in such a manner as to improve the rate of reaction by securing closer and more complete contact between the catalyst and the reactants and to improve thereby both the rate of reaction and the total yield.

These objects, as well as others which will be apparent upon a fuller understanding of the invention, are accomplished by condensing isoparaffins with monoolefins in the presence of normally liquid catalysts which are customarily employed for such reactions, and in order to enhance the yield of the desired products to materially decrease the length of time required to attain these yields it has been found that the objects of the invention may be attained by providing means whereby increased surface contact between the catalysts and the reactants is attained. Thus, for example, where concentrated sulfuric acid, that is, sulfuric acid having a concentration of at least 90% and preferably at least 95%, is contacted with isobutane and $C_4$ olefins to produce iso-octane, it has been found that the use of solid adsorbents admixed with the normally liquid catalyst materially enhances the desired product both as to quality and as to quantity. The efficiency of contact between the normally liquid catalyst for the reaction and the reactants which has been found to be a controlling factor in yields produced is materially improved by adding such a solid adsorbent to the reaction mixture. In a variety of experiments investigating the alkylation reaction, it has been found necessary to provide intensive agitation so that intimate contact is provided between the catalyst and the reactants. This agitation is a critical factor in the yield of the desired highly branched product obtained, and in commercial plant scale work, special equipment is necessary to effect the degree of agitation required. By following the process of the present invention, the design requirements in this respect may be simplified without sacrificing either the essential reaction time or the desired yield of products.

It is not within the purview of this invention to carry out such hydrocarbon condensation reactions as heretofore mentioned in the presence of catalyst compositions which are substantially solid in nature or solid plus an adsorbed liquid to give a solid contact mass. The invention is applied particularly in cases where the catalyst is normally liquid in character, or liquid containing a dissolved gas, or where the catalyst is a mixture of liquids interspersed with or containing suspended adsorbent solids which do not materially affect its fluidity. Essentially, therefore, the type of reactions to which the present invention applies are those employing liquid phase operations. If necessary, the use of superatmospheric pressure is employed in order to maintain all or a substantial portion of the reactants in the liquid state under the reaction conditions obtaining.

As the major component of the catalytic mass, any number of compounds may be employed, for example, boron fluoride admixed with one or more of the flowing: water, sulfuric acid, phosphoric acid, and hydrogen halides as, for example, hydrogen fluoride, concentrated sulfuric acid either alone or admixed with hydrogen halides such as, for example, hydrogen chloride and hydrogen fluoride, orthophosphoric acid, tetraphosphoric acid, mixtures of orthophosphoric or tetraphosphoric acid admixed with concentrated sulfuric acid. These various types of active polymerization and/or alkylation catalysts may be pre-absorbed in the hereinafter mentioned adsorbent materials or they may be added to the condensation reactions in their conventional and usual manner and the adsorbent material then added to the reaction system.

The particular type of solid adsorbent to be employed in the present invention may depend somewhat on the specific catalyst and the reaction being catalyzed, although the invention is not restricted to the use of any specific type of adsorbent. It is within the purview of the invention to employ any adsorbent which serves as such in the reaction so that in effect the catalyst is contacting the reactants with a much greater effective surface area. When using a strong mineral acid catalyst, as in an alkylation reaction for example, it may be preferable to add an inert or relatively inert adsorbent such as activated carbon, charcoal, kieselguhr, Sil-O-Cel, Cellite or a suitable type of silica gel. In certain cases it may be well to employ other adsorbents such as bauxite, alumina gel, alumina or silica gel, synthetic clays such as mixtures of silica and alumina in varying weight ratios, bentonitic clays of the montmorillonite type, Filtrol, Tonsil, Floridin, Marsil, fuller's earth, acid clays, or the like. Any of these materials may be subjected to a preliminary chemical or physical treatment, if desired, to remove objectionable impurities or to improve their adsorbent properties. Even in those cases where the adsorbent is chosen so as to be inert toward an acid catalyst, it need not necessarily be inert with respect to the reaction involved. As is well known, synthetic materials may assert a beneficial effect toward promoting certain desired reactions, such as the isomerization of normal paraffins. They may, also, to some extent have a catalytic effect on the reaction. However, their selection in the present invention is chiefly by reason of their high surface area per unit of volume and by reason of the fact that the chief catalytic component of the reaction mixture is thereby afforded an increased surface area for effecting intimate contact with the reactants.

Not only may the adsorbent be added directly to the major catalytic component so as to create a suspension of the adsorbent in the catalyst liquid but the adsorbent material may be pretreated with one or more of a number of normally solid inorganic salts which in and of themselves are known to promote the condensation reactions. This pre-treatment is usually effected by dissolving the solid salts in a suitable liquid so that the adsorbent either completely takes up or partially takes up the solution containing the salt and the resulting adsorbent is then added to the catalytic liquid or the salt-containing solvent may be admixed with the normally liquid catalytic component either before or after adding sufficient adsorbent to create a slurry or suspension within the catalyst mass. As examples of suitable salts which may be added may be mentioned zinc chloride aluminum chloride, aluminum bromide, iron chloride and the like.

The particular size of the adsorbent particles added to the liquid catalyst mass may vary considerably. Thus, for example, depending upon the specific type of reaction, the settling rate of the adsorbent used in a given reaction mixture, the type of apparatus employed, and other variables, the adsorbent particle size may range between about 30 mesh to 200 mesh. Obviously, particle sizes outside of this range may be employed but they are not at this time considered to be practical for the type of operation herein specified. With certain adsorbents where the amount of surface area depends in large measure on the degree of subdivision of the material, it may be advisable to use a very fine particle size. There is a practical limiting factor here, in that material too finely divided may be difficult to separate from a liquid suspension.

The amount of adsorbent added depends to a large extent upon the amount of contact surface desired for the particular reaction under consideration. However, it is not desirable to add to the liquid catalyst mass enough solid adsorbent material to materially affect the fluidity of the final composition. The catalyst mass, either as a fresh catalyst mass or as a spent catalyst mass, should not have so much solid adsorbent admixed therewith that it becomes difficult or impossible to pump the liquid suspension or slurry and to efficiently separate solids from the catalyst composition by means customarily employed for such slurries or suspensions. In general, between about 0.1% and about 10% by weight of the final catalyst mass may be composed of added solid adsorbent material.

The solid adsorbent may be employed in any number of desirable forms, such as granules, pellets, powder and the like. The particle size as previously stated is selected more as a matter of judgment with regard to the particular equipment which is being employed.

As reactants for the alkylation process described, there may be mentioned isobutane, isopentane, and similar higher homologues containing at least one tertiary carbon atom per molecule or mixtures of two or more of these isoparaffinic hydrocarbons.

As olefinic reactants, there may be employed ethylene, propylene, normal butylenes, isobutylene, the isomeric pentenes, and similar higher monoolefinic hydrocarbons of either a straight chain or branched chain structure. Either normally liquid or normally gaseous hydrocarbon reactants may be employed. Thus, it is possible to use normally liquid monoolefins derived from polymerization or interpolymerization reactions. Mixtures of two or more of the olefins are also contemplated as suitable feed stocks for the alkylation reaction. Various refinery gaseous stocks such as $C_3$, $C_4$ and/or $C_5$ cuts from thermal and/or catalytic cracking units, field butanes which have been subjected to crude fractionation, isomerization and/or partial dehydrogenation treatments, refinery stabilizer bottoms, spent gases and liquid products from catalytic polymerization and co-polymerization processes employing any suitable catalysts, are all excellent feed stocks either as such or when blended to the desired proportions for use in the present process. Many of the refinery gaseous cuts which are on hand for use in the process contain small amounts of diolefins such as, for example, butadiene. These diolefins are not particularly harmful to the process and it is therefore unnecessary to take special steps to remove them. Diolefins present in alkylation processes are thought to alkylate in much the same manner as the monoolefins.

In carrying out the reaction it has been found to be desirable to maintain a substantial molar excess of isoparaffin per molecule of the monoolefinic components of the reaction mixture, and to operate in a medium containing large quantities of the catalyst. Thus, where isobutane or isopentane is employed the molar ratio of isoparaffin to olefin may range from 1 to 10 or 30 mols of isoparaffin to olefinic components. Equicolar quantities may, however, be employed with some sacrifice of yield.

The process may be carried out either as a batch or continuous liquid phase operation, although it is preferred for economic reasons to carry the same out continuously. No special type of apparatus is required for effecting the reaction in practicing the present invention. However, it is preferable to employ reactors containing either baffle plates or some other type of mixing plates, a modern mechanical stirring mechanism, mixing jets or a simple mixing pump. Some degree of efficient agitation is desirable, as has heretofore been explained, although the intense agitation customarily employed in alkylation reactions is no longer as critical in effecting the high yields desired. In continuous processes, the reactor contains a recycle line through which the emulsion and slurry pass back into the reaction zone any number of times. At the conclusion of the desired reaction time, a portion of the circulating suspension and emulsion is withdrawn to a suitable separator for effecting a separation between the hydrocarbon product produced and the catalyst and adsorbent admixed therewith. Any suitable separating means may be employed such as, for example, a simple settling tank from the top of which the hydrocarbon product is withdrawn and from the bottom of which the catalyst slurry is withdrawn for return to the reactor or for further separation of adsorbent from catalyst. Other types of separator may be employed such as, for example, centrifuges or cyclone separators. Likewise, these devices as well as Cuno filters, etc., may be employed for effecting a separation of adsorbent from catalyst, such procedure ofttimes becoming necessary in order to effect a separate rejuvenation or regeneration of the catalyst liquid and to re-open the pores of the adsorbent material. In the preferred embodiments of the invention no special type of rejuvenation treatment for either the adsorbent or the catalyst is necessary, since their chemical constitution and physical structure are substantially those found in other types of reactions involving the treatment of hydrocarbon petroleum products.

The temperature at which the alkylation reaction is carried out may vary over wide ranges, depending upon the particular catalyst or catalyst mixture employed. However, it may be stated that in general these temperatures are those which are customarily employed for the particular catalyst composition when no solid adsorbent material has been added to the reaction mixture. In the case of concentrated sulfuric acid, this temperature lies somewhere between about 30° F. and 100° F. In the case of boron trifluoride and water, this temperature lies between 35° F. and 150° F., and so forth. Likewise, the length of time necessary for effecting the reaction and for permitting the reaction to reach substantial equilibrium will be of the order heretofore known in connection with the use of the catalyst under the other specific reaction conditions except that the use of the solid adsorbent material decreases the required reaction time by as much as about 20% to about 40%, of course depending upon the amount of solid adsorbent material added thereto.

As illustrative of the method of carrying out the invention but without restricting the invention to the same, the following examples are submitted herewith:

*Example 1*

To 730 grams of 96% sulfuric acid containing about 2% of silica gel by weight there was admixed about 360 grams of isopentane and the mixture was agitated for a period of about 40 minutes over which time there was gradually added thereto about 94 grams of diisobutylene while maintaining the temperature of the reaction at about 70° F. Excellent emulsification of the reaction mixture was obtained. At the conclusion of the 40-minute addition period the reaction mixture was agitated for an additional 80 minutes. The normally liquid, substantially completely saturated product constituting the $C_6$ and heavier fraction was obtained in a yield of about 280% by weight based upon the olefin added to the reaction mixture. Of this product about 70% constituted the $C_6$—$C_9$ fraction.

*Example 2*

To about 733 grams of 96% sulfuric acid containing about 2% by weight of Super Filtrol there was admixed about 360 grams of isopentane. This mixture was then agitated over a period of two hours while maintained at a temperature of about 70° F. During the first 40 minutes of this agitation there was added about 94 grams of diisobutylene slowly. A substantially completely saturated product in a yield of about 218% by weight based on the isobutylene added to the reaction mixture was obtained. Of this product about 70% boiled within the $C_6$—$C_9$ fraction and had a zero bromine number.

*Example 3*

Under the same reaction conditions as in Example 1, except that the catalyst instead of containing about 2% by weight of silica gel or about 2% of Super Filtrol contained about 2% of activated coconut charcoal, a product was obtained in about 258% by weight based on the total olefin added, of which about 69% by weight constituted a $C_6$—$C_9$ fraction. Both products were substantially completely saturated in character. In this run, good emulsification during reaction and good settling of the acid layer from the hydrocarbon layer were experienced.

As a basis for strict comparison, a run was made under identical conditions to those specified in Example 1 except that the sulfuric acid contained no adsorbent added thereto. In such cases the yield of alkylate produced was about 247% based on the olefin added. This product was likewise substantially completely saturated in character. However, it was noted that of this product only about 67.6% of $C_6$—$C_9$ fraction was produced.

While the invention has been described largely in terms of catalytic alkylation, it is recognized that it may also be useful more broadly in other hydrocarbon reactions catalyzed by liquid acids, such as certain types of olefin polymerization employing more dilute sulfuric acid or the isomerization of straight chain paraffins to more valuable isomeric compounds such as, for example, the conversion of normal butane to isobutane.

The nature and objects of the present invention having been thus fully described, what is claimed as new and useful and desired to be secured by Letters Patent is:

1. A process which comprises condensing olefinic hydrocarbons under suitable condensation conditions in the presence of a condensation catalyst composition comprising a normally liquid condensation catalyst and a minor portion of a solid adsorbent material suspended therein said adsorbent being substantially chemically inert to the catalyst.

2. A process which comprises alkylating isoparaffin with monoolefin in the presence of a liquid alkylation catalyst composition under alkylation reaction conditions, said catalyst composition comprising a suspension of a small amount of at least one solid adsorbent material which is substantially chemically inert towards the catalyst used in a normally liquid alkylation catalyst.

3. A process as in claim 1 wherein siliceous bodies are employed as the solid adsorbent material.

4. The process as in claim 2 wherein siliceous bodies are employed as the solid adsorbent material.

5. A process which comprises alkylating isoparaffin with monoolefin in the presence of a free flowing inorganic mineral acid, alkylation catalyst mass whose composition also contains a minor amount of an adsorbent gel suspended therein, said gel being substantially chemically inert to the acid catalyst.

6. A process which comprises alkylating isoparaffin with a monoolefin in the presence of a free flowing suspension of adsorbent carbon in an inorganic mineral acid alkylation catalyst.

7. A process which comprises alkylating isoparaffin with monoolefin in the presence of a free flowing suspension of diatomaceous earth in an inorganic mineral acid alkylation catalyst under alkylation reaction conditions.

8. A process which comprises reacting a composition containing at least one isoparaffin and a composition containing at least one monoolefin wherein the isoparaffinic component of the feed stock is present in substantial molar excess over the olefinic component at a temperature between about 25° F. and about 100° F., with agitation in the presence of sulfuric acid of a concentration between about 90% and about 100%, said sulfuric acid containing between about 0.1% and about 10% by weight of a solid, adsorbent material suspended therein, said material being substantially chemically inert to the acid.

9. A process as in claim 8 wherein it is carried out continuously and at least under sufficient superatmospheric pressure to maintain the reactants as well as the catalyst and the final product in liquid phase.

10. A process which comprises alkylating isopentane with diisobutylene, the isopentane being present in about a 3:1 molar ratio with reference to the diisobutylene at a temperature of about 70° C. in the presence of 97% sulfuric acid containing silica gel suspended therein in the amount of about 2%.

11. A process which comprises alkylating isopentane with diisobutylene, the isopentane being present in about a 3:1 molar ratio with reference to the diisobutylene at a temperature of about 70° C. in the presence of 97% sulfuric acid containing an activated carbon in the amount of about 2% suspended therein.

12. A process as in claim 2 wherein the isoparaffin is isopentane, the olefin a normally gaseous monoolefin, and the catalyst concentrated sulfuric acid of between about 90% and about 100% strength.

HOMER J. HALL.